INVENTOR.
Howard M. Geyer
BY
*W. E. Finken*
His Attorney

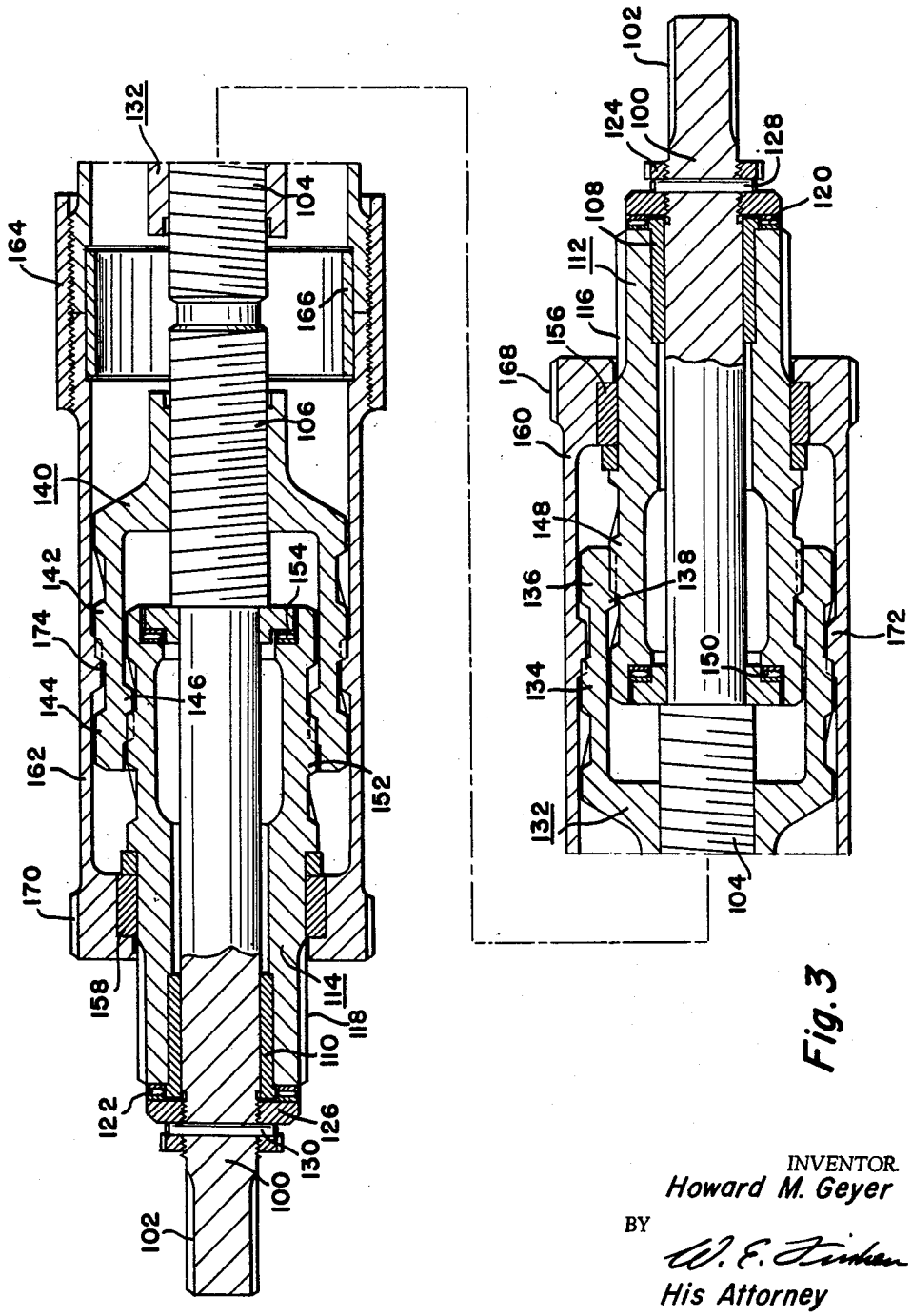

United States Patent Office 3,154,954
Patented Nov. 3, 1964

3,154,954
MECHANICAL ROTARY ACTUATORS
Howard M. Geyer, Dayton, Ohio, assignor to General Motors Corporation, Detroit, Mich., a corporation of Delaware
Filed May 8, 1962, Ser. No. 193,186
3 Claims. (Cl. 74—89)

This invention pertains to rotary actuators, and particularly to mechanically operated, rotary actuators of the helical spline type.

Heretofore, it has been proposed to utilize multiple, hydraulically operated, rotary actuators in the form of a power hinge to operate pivotally movable control surfaces on aircraft. A system of this type is shown in my copending application Serial No. 797,294, filed March 4, 1959, now Patent No. 3,063,473. The present invention relates to mechanically operated, rotary actuators for use in such a system thereby eliminating the need for conduits to hydraulically interconnect the several actuators. Moreover, in the mechanical actuator system of this invention, input power can be supplied manually, or by remotely located hydraulic or electric motor means.

Accordingly, among my objects are the provision of a mechanical actuator system including a plurality of coaxial, spaced apart, mechanical actuators having a common through shaft input; the further provision of an improved screw and nut type actuator of the helical spline type having a rotary input and a rotary output; and the still further provision of a dual screw and nut actuator.

The aforementioned and other objects are accomplished in the present invention by attaching to, or forming integral with the nut, a helically splined member that coacts with a helically splined reaction member and a helically splined output member such that reciprocation of the nut imparts rotary movement to the output member. Specifically, two embodiments of the improved rotary mechanical actuators are disclosed herein, and both embodiments can be used in a multiple actuator system wherein the input comprises a through shaft. In one embodiment each actuator is of the ball screw and nut type, the screw being coaxially disposed within a two-part housing having a relatively small size envelope. Each part of the housing is formed with internal helical splines, and the nut has a skirt attached thereto with spaced sets of external helical splines. One part of the housing is attached to a fixed mounting support, thus constituting the reaction member, and the other part of the housing is free to rotate, thus constituting an ouput member.

In the second embodiment, each actuator comprises a rotatable screw shaft having spaced left and right hand, reversible, threaded portions which are engaged by a pair of spaced nuts. The nuts are formed with integral skirts having internal and external helical splines. The internal helical splines mate with a pair of rotary output members having external helical splines, and the external helical splines on the skirts mate with internal helical splines formed on a common reaction member. In the second embodiment rotation of the input shaft results in simultaneous movement of the two nuts in opposite directions so as to effect synchronized rotary movement of the two output members.

The actuators of both embodiments can be embodied in a multiple rotary actuator system wherein the several actuators are spaced apart and coaxially arranged, and wherein the input shafts are operated by a common drive. The common drive may take the form of a rotary hydraulic motor or a rotary electric motor, provision being made for emergency manual operation by means of a hand crank.

Further objects and advantages of the present invention will be apparent from the following description, reference being had to the accompanying drawings, wherein preferred embodiments of the present invention are clearly shown, and wherein similar numerals depict similar parts throughout the several views.

In the drawings:

FIGURE 3 is a longitudinal sectional view of a dual mechanical rotary actuator constructed according to another embodiment of the present invention.

Figures 1, 2:
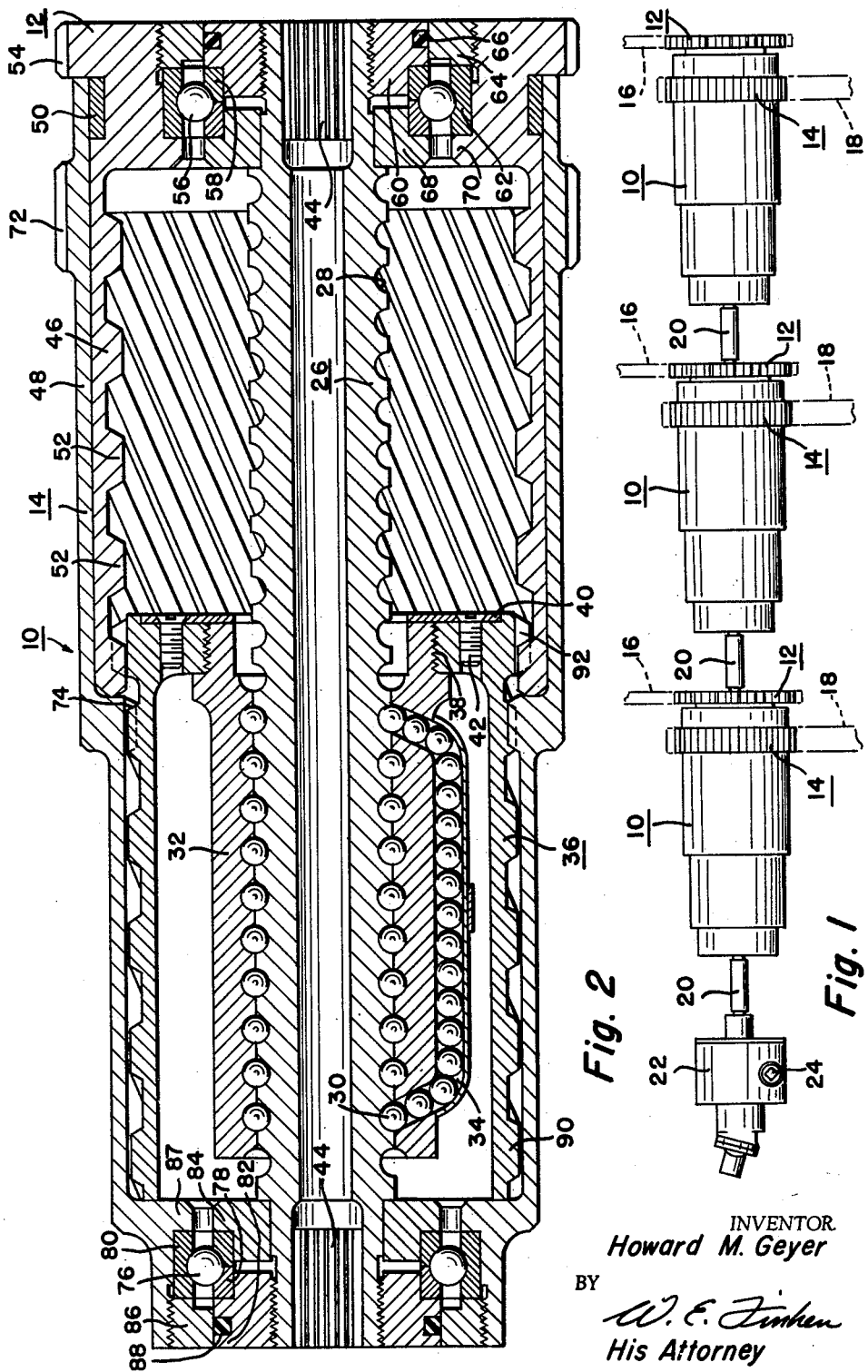
FIGURE 1 is a plan view, in elevation, of a multiple rotary actuator system constructed according to the present invention.
FIGURE 2 is a longitudinal sectional view of the mechanical rotary actuator constructed according to one embodiment of this invention.

With reference to FIGURE 1, a multiple mechanical actuator system is shown comprising three identical mechanical actuators 10 of the screw and nut type, which are coaxially arranged and located in spaced apart relation. Each actuator includes a rotary output member 12 and a reaction member 14. The output members are shown connected to movable control surfaces 16, and the reaction members 14 are shown connected to fixed supports 18. In addition, the actuators are interconnected by tubular drive shafts 20. The tubular drive shaft 20 of the left hand actuator 10 of FIGURE 1 is shown connected to the output of a rotary hydraulic motor 22 of conventional design having a socket 24 for receiving a hand crank to facilitate emergency manual operation. It is to be understood, however, that the use of a hydraulic motor 22 is only exemplary since the multiple mechanical actuator system could obviously be operated by any other suitable rotary power means, such as an electric motor.

Referring to FIGURE 2, in one embodiment each mechanical actuator 10 shown in the system of FIGURE 1 includes a hollow screw shaft 26 constituting a component of a ball screw and nut assembly. Thus the screw shaft 26 is formed with a helical semicircular groove 28 for receiving a plurality of balls 30 which threadedly interconnect the screw shaft 26 with a nut 32. The nut 32 includes a circulating conduit 34 for the balls 30. The nut 32 has an axially extending skirt 36 attached thereto by threads 38 and a plate 40 secured to the skirt 36 by screws 42. Thus, the skirt 36 is constrained for movement with the nut 32, and will move axially with the nut 32 upon rotation of the shaft 26.

The screw shaft 26 is formed with internal straight splines 44 at each end thus enabling the screw shaft 26 to be connected to tubular shafts 20, as shown in FIGURE 1. The ball screw and nut assembly together with the skirt 36 is enclosed in a two-part housing comprising the reaction member 14 and the output member 12. The members 12 and 14 have telescopically arranged, relatively rotatable portions 46 and 48. A sleeve bearing 50 journals the output member 12 for rotation relative to the reaction member 14. The sleeve portion 46 of the output member 12 is formed with an elongate set of internal helical spline teeth 52. In addition, the output member 12 is formed with a set of external straight spline teeth 54 for connecting it to the control surface 16.

The right hand end of the screw shaft 26 is journalled in the output member 12 by a combined radial and thrust ball bearing assembly 56 having a split inner race 58 retained in position by a nut 60, and an outer race 62 retained in position by a nut 64. The nuts 60 and 64 are concentrically arranged and confine an O-ring seal therebetween. The nut 60 seats the split inner race 58 against a collar 68, while the nut 64 seats the outer race 62 against an integral shoulder 70 on the output member 12.

The sleeve portion 48 of the reaction member 14 is formed with a set of external straight spline teeth 72 for securing the same to the fixed mounting support 18. In addition, the reaction member 14 is formed with a set of relatively short internal helical spline teeth 74. The left hand end of the screw shaft 26 is supported in the reaction member 14 by a combined radial and thrust ball bearing assembly 76 having a split inner race 78 and an outer race 80. The split inner race 78 is held in position by a nut 82 against a collar 84, and the outer race 80 is held in position by a nut 86 against an integral shoulder 87 on the reaction member 14. Similarly, the concentrically arranged nuts 82 and 86 confine an O-ring seal 88 therebetween.

The skirt 36 is formed with a relatively elongate set of external helical spline teeth 90 and a second set of relatively short external helical spline teeth 92. The external helical spline teeth 90 mate with the internal helical spline teeth 74 in the reaction member 14, while the short external helical spline teeth 92 mate with the internal helical spline teeth 52 formed on the sleeve 46 of the output member 12. The helical splines on the reaction and output members can be of the same hand, different hands, of the same leads, or different leads, depending upon the torque and angular movement requirements of the output members. As the screw shaft 26 is rotated, the nut 32 will be reciprocated, in one direction or the other, dependent upon the direction of rotation of the screw shaft 26. Since the skirt 36 is constrained for movement with the nut 32 and is engaged with the helical splines on the reaction and output members, reciprocation of the nut and skirt will be accompanied by angular movement, which angular movement will be imparted to the output member 12.

With reference to FIGURE 3, another embodiment of a mechanical rotary actuator of the dual screw and nut type is shown. This actuator may likewise be used in a multiple system as shown in FIGURE 1, and comprises a centrally arranged through shaft 100 having external straight spline teeth 102 at each end. The shaft 100 is formed with spaced apart left and right hand threaded portions 104 and 106, respectively. The shaft 100 is journalled by spaced sleeve bearings 108 and 110 in spaced tubular output members 112 and 114. The tubular output members 112 and 114 are formed with external straight spline teeth 116 and 118, respectively, for connecting the same to the control surfaces 16. In addition, to support the outward thrust loads imposed on the output members 112 and 114, needle-type thrust bearings assemblies 120 and 122 are held in assembled relation with the input shaft 100 and the output members 112 and 114 by nuts 124 and 126 and cross pins 128 and 130, respectively.

The left hand threaded portion 104 receives a nut 132 having an integral skirt 134 with a relatively elongate set of external helical spline teeth 136 and a relatively short set of internal helical spline teeth 138. The right hand threaded portion 106 engages a nut 140 having an integral skirt 142 with a relatively elongate set of external helical spline teeth 144 and a relatively short set of internal helical spline teeth 146. The internal helical spline teeth 138 on the skirt 134 mate with a relatively elongate set of external helical spline teeth 148 on the output member 112. The inner end of the output member 112 supports a needle thrust bearing assembly 150. The relatively short internal helical spline teeth 146 on the skirt 142 engage a relatively elongate set of external helical spline teeth 152 on the output member 114 which supports a needle-type thrust bearing assembly 154 at its inner end. The output members 112 and 114 are journalled by sleeve bearings 156 and 158, respectively, in reaction members 160 and 162, respectively. The reaction members, or sleeves, 160 and 162 are interconnected by a threaded sleeve 164 and are maintained in coaxial relationship by an internal, close fitted annulus 166.

The reaction members 160 and 162 are formed with external straight spline teeth 168 and 170, respectively, for attachment to the fixed mounting supports 18. In addition, the reaction member 160 is formed with a relatively short set of internal helical spline teeth 172, and the reaction member 162 is formed with a relatively short set of internal spline teeth 174. The helical spline teeth 172 mate with the helical spline teeth 136 on the skirt 134, and the helical spline teeth 174 mate with the helical spline teeth 144 on the skirt 142.

It will be appreciated that since the left and right hand threaded portions 104 and 106 are formed integrally with the input shaft 100, the nuts 132 and 140 move simultaneously in opposite directions upon rotation of the input shaft 100. Moreover, reciprocation of the nuts 132 and 134 in opposite directions will be accompanied by angular movement thereof by virtue of the helical spline connections between the skirts with the reaction means and the output members. Moreover, the angular movement imparted to the output members 112 and 114 will be synchronized with the amplitude and torque being dependent upon the character of the helical spline connections between the skirts and the reaction members, and between the skirts and the output members.

While the embodiments of the invention as herein disclosed constitutes preferred forms, it is to be understood that other forms might be adopted.

What is claimed is as follows:

1. A screw and nut actuator of the rotary type including, relatively rotatable, coaxial output and reaction members having telescopically arranged portions, a screw shaft supported in said output and reaction members for rotation relative thereto, a nut having threaded engagement with said screw shaft, a skirt attached to said nut and coaxial with said output and reaction members, helical means interconnecting said skirt with each of said output and reaction members, and means for connecting said reaction member to a fixed support whereby rotation of said screw shaft will impart rotation to said output member.

2. The screw and nut actuator set forth in claim 1 wherein the helical means interconnecting said skirt with each of said output and reaction members comprises helical spline teeth.

3. The screw and nut actuator set forth in claim 2 wherein said helical spline teeth comprise a relatively short set of internal helical spline teeth on said reaction member mating with a relatively elongate set of external helical spline teeth on said skirt, and a relatively elongate set of internal helical spline teeth on said output member mating with a relatively short set of external helical spline teeth on said skirt.

References Cited in the file of this patent

UNITED STATES PATENTS

| | | |
|---|---|---|
| 1,946,309 | Coffman | Feb. 6, 1934 |
| 2,660,029 | Geyer | Nov. 24, 1953 |
| 2,890,594 | Galonska | June 16, 1959 |
| 2,959,064 | Geyer et al. | Nov. 8, 1960 |
| 3,020,775 | Musser | Feb. 13, 1962 |
| 3,036,472 | Geyer | May 29, 1962 |
| 2,090,244 | Davis | May 21, 1963 |